April 19, 1955     J. R. OISHEI     2,706,305
WINDSHIELD WIPER
Filed June 10, 1953
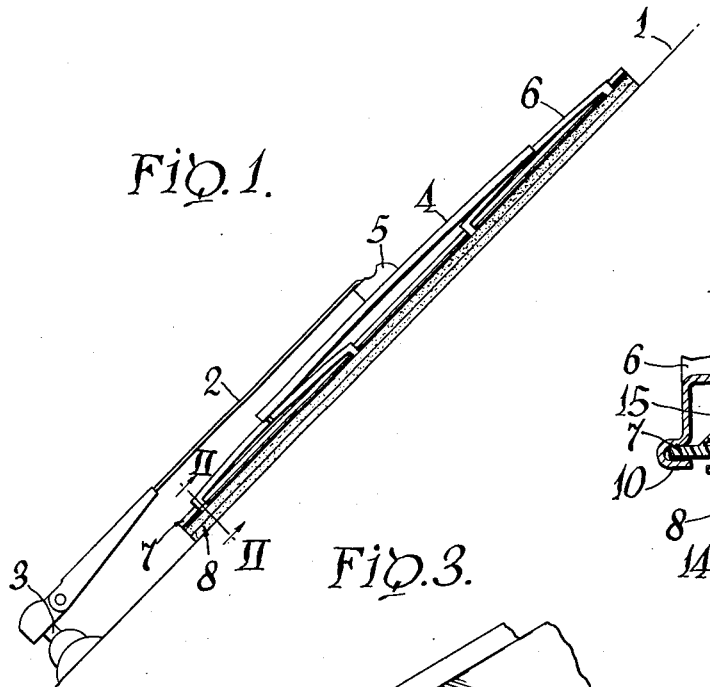
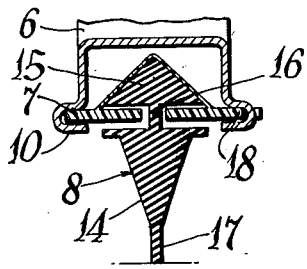
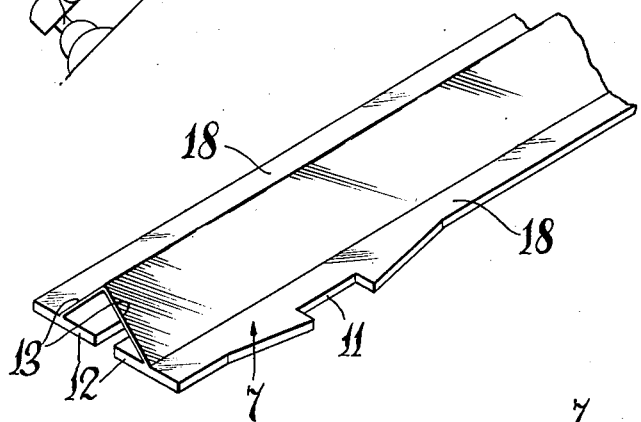
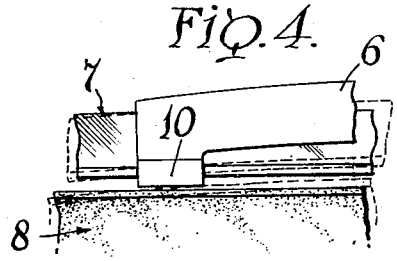
INVENTOR.
John R. Oishei,
BY
Bean, Brooks, Buckley & Bean.
ATTORNEYS.

10 # United States Patent Office 2,706,305
Patented Apr. 19, 1955

2,706,305

WINDSHIELD WIPER

John R. Oishei, Buffalo, N. Y., assignor to Trico Products Corporation, Buffalo, N. Y.

Application June 10, 1953, Serial No. 360,704

5 Claims. (Cl. 15—245)

This invention relates to wipers of the type employed to clean curved windshields on automotive vehicles.

The wipers conventionally employed to clean curved windshields comprise a superstructure having a plurality of pressure distributing yokes attached to a flexible backing strip which loosely carries a squeegee. The pressure is applied by a spring pressed actuator arm to the superstructure, the yokes of which transmit and distribute the pressure along the length of the backing strip. As a result of the distribution of pressure therealong, the backing strip tends to adopt the general curvature of the windshield with the play connection between it and the squeegee permitting the latter to conform to local surface irregularities.

In order to impart the requisite flexibility to the backing strip and permit play between it and the squeegee, it has been found necessary to slit the strip transversely at a plurality of positions along its longitudinal axis and raise the portions thereof between alternate slits so as to form a plurality of arched cross-arms or transverse vertebrae. The metal segments between the vertebrae are removed, and it is these areas between the vertebrae that flex and permit surface conformance by the backing strip. Space is provided between the raised vertebrae and the anchoring bead of the squeegee to allow for the play or relative movement of the latter when needed.

If the vehicle is employed in an area where precipitation is prevalent during periods of sub-freezing weather, snow or rain tends to collect in and fill the region between the vetebrae and the squeegee, and freeze solid, with a resultant diminishment of the flexibility of the strip and the elimination of the play between it and the squeegee. This greatly diminishes the efficiency of the wiper since the backing strip can no longer conform to the constantly changing curvature of the windshield during the cycle of operation, and the squeegee is no longer able to adapt itself to local irregularities.

Accordingly, it is the primary object of this invention to completely hood the area between the backing strip and the squeegee so as to prevent the formation and collection of ice therein.

For a better understanding of this and other objects of the invention, reference is made to the following specifications and accompanying drawings wherein:

Fig. 1 is a schematic representation of a windshield wiper constructed in accordance with the present invention;

Fig. 2 is a view taken on line II—II of Fig. 1 and to a larger scale;

Fig. 3 is a perspective view of the backing strip; and,

Fig. 4 is a view to an enlarged scale of a portion of the wiper, illustrating how binding between the secondary yoke and the backing strip is prevented.

Referring now more particularly to the drawings, the numeral 2 designates the actuator arm mounted on rock shaft 3 of the wiper motor at one end and attached to clip 5 at the opposite end. The clip is mounted on primary yoke 4 of the superstructure which is attached at its opposite ends to medial portions of secondary yokes 6. The flexible backing strip 7 is slidably connected to the secondary yokes, via inturned ears 10 on the yokes and exterior flanges 18 on the strip. One of the ears engages undercut portion 11, some play being permitted therebetween. It is this play connection which delimits the extent of the relative sliding movement between the yokes and backing strip.

Referring now more particularly to Fig. 3, the backing strip is formed of a flexible, longitudinally stretchable plastic such as nylon. It comprises two parallel flanges 18 connected one to the other by an inverted V-shaped hood which forms the weather chamber. The flanges may be extended inwardly as at 12 to provide means to loosely anchor the squeegee within the weather chamber, or other convenient means may be provided for this purpose. It should be noted that the thickness of the hood is considerably less than that of the flanges. This dimensional variance enhances the flexibility of the backing strip, since it facilitates the longitudinal stretching and the flexing of the hood as the backing strip is urged into conformance with the curvature of the windshield.

The squeegee 8 comprises a marginal anchoring bead 15 connected by neck 16 to body portion 14 which tapers to a wiping edge 17, and it is connected to the backing strip by telescoping the bead 15 within the channel formed by hood 13 and the inwardly extending flanges 12. It should be noted that sufficient clearance is permitted to allow for a limited amount of relative movement between the backing strip and the squeegee transversely of their longitudinal axes. As is most clearly indicated in Fig. 4, considerable clearance is allowed between the ears 10 on the secondary yokes 6, and the outer edges of the horizontal flanges 18 of the backing strip. It is because of the freedom of movement permitted by this clearance that the inherently flexible backing strip may conform to the curvature of the windshield without binding in the ears.

It may thus be seen that by making the backing strip of a plastic material such as molded or extruded nylon it is possible to eliminate the transverse vertebrae existent in present blades. The elimination of such vertebrae provides the opportunity to utilize a hood for preventing the formation of ice in the area between the squeegee and backing strip, thus avoiding the deleterious effect upon the flexibility of the unit resulting from the formation of such ice.

Having thus disclosed an exemplary embodiment thereof, what I claim as my invention is:

1. A wiper for cleaning curved surfaces comprising, a pressure distributing superstructure, an elongated backing strip substantially uniformly flexible throughout its entire length connected to said superstructure, said backing strip having a longitudinal hood, and a flexible squeegee carried by the backing strip, said squeegee having an anchoring part covered by and contained within the hood throughout substantially the entire length of the squeegee.

2. A windshield cleaner for curved windshields comprising, a pressure distributing superstructure, a backing strip substantially uniformly flexible throughout its length having a longitudinal V-shaped hood, means for connecting the backing strip to the superstructure, inwardly extending flanges on said backing strip, and a squeegee having a longitudinal anchoring bead thereon, said anchoring bead being contained within and covered by said hood throughout substantially its entire length, said flanges loosely retaining the bead within the hood.

3. A molded plastic backing strip for a windshield wiper having a squeegee with an anchoring bead thereon, said strip comprising an elongated member substantially uniformly flexible throughout its length, said member having a V-shaped hood extending throughout substantially its entire length for enclosing the anchoring bead, and inwardly extending flanges relatively heavier than the hood walls for retaining the bead within the hood.

4. A molded plastic backing strip for a windshield wiper having a pressure distributing superstructure with ears thereon and a squeegee provided with an anchoring bead, said strip comprising an elongated member substantially uniformly flexible throughout its length, said member having a V-shaped hood extending throughout substantially its entire length for enclosing the anchoring bead, and outwardly extending flanges relatively heavier than the hood walls for engagement with the superstructure ears.

5. A molded plastic backing strip for a windshield wiper having a pressure distributing superstructure with ears thereon and a squeegee provided with an anchoring bead, said strip comprising an elongated member substantially uniformly flexible throughout its length, said member having a V-shaped hood extending throughout substantially its entire length for enclosing the anchoring bead, inwardly extending flanges relatively heavier than the hood walls for retaining the bead within the hood, and outwardly extending flanges relatively heavier than the hood walls for engaging the superstructure ears.

References Cited in the file of this patent

UNITED STATES PATENTS 2,649,605    Scinta et al.  ------------ Aug. 25, 1953